United States Patent [19]

Jaegle

[11] 3,867,551

[45] Feb. 18, 1975

[54] PREPARATION OF BEER

[76] Inventor: Yves Germain Jaegle, 56, Allee de la Robertsau 67, Strasbourg, France

[22] Filed: Aug. 9, 1972

[21] Appl. No.: 279,208

[30] Foreign Application Priority Data

Aug. 20, 1971  France .............................. 71.31265

[52] U.S. Cl. .................................... 426/16, 426/11
[51] Int. Cl. ............................................. C12c 11/04
[58] Field of Search ............. 99/31, 51, 52; 426/16, 426/11, 13

[56] References Cited
UNITED STATES PATENTS

| | | | |
|---|---|---|---|
| 3,249,443 | 5/1966 | Reater .................................... | 99/51 |
| 3,484,244 | 12/1969 | Kozulas et al. .......................... | 99/31 |
| 3,729,321 | 4/1973 | Vacano ................................... | 99/31 |

OTHER PUBLICATIONS

Delente et al., Carbon Dioxide in Fermenting Beer, Master Brewers Association of America's Technical Quarterly. Vol. 5, Nos. 3 & 4 1968 (pp. 187–192 & 228–234).

*Primary Examiner*—David M. Naff
*Attorney, Agent, or Firm*—Robert E. Burns; Emmanuel J. Lobato; Bruce L. Adams

[57] ABSTRACT

Beer is prepared by a process wherein groups of batches of wort are turned serially at temperatures increasing from 10° to 14.5°C into a cylindrical, vertically disposed vat having a conical bottom. Convection currents are instituted to homogenize the contents of the vat and fermentation is carried out until a beer of the desired degree of fermentation is formed. The resultant beer is mellowed by a warm keep phase, cooled and subjected to a cold keep phase.

7 Claims, 1 Drawing Figure

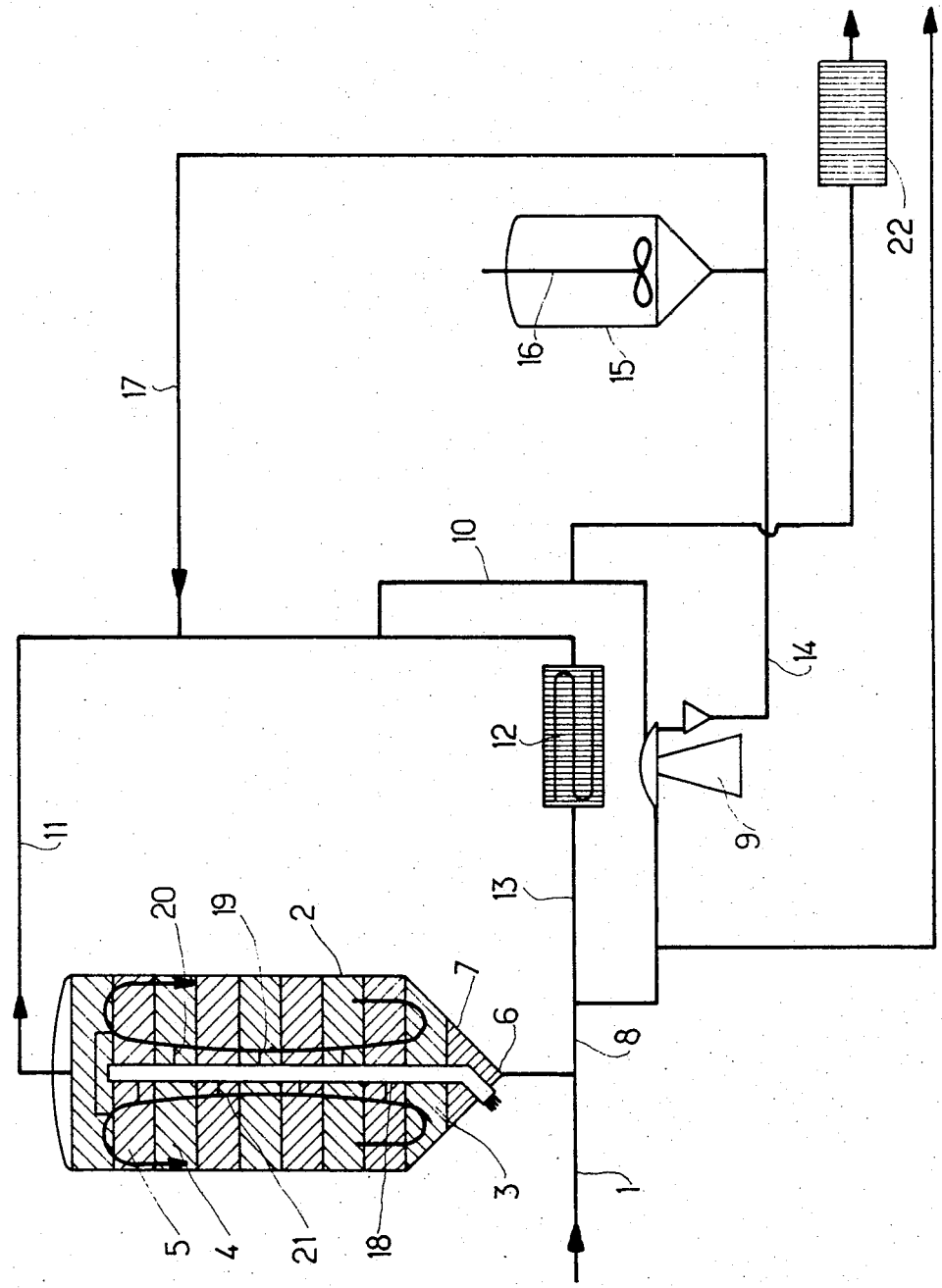

PREPARATION OF BEER

FIELD OF THE INVENTION

This invention relates to a new fermentation process in particular for beer.

BACKGROUND OF THE INVENTION

For the production of beer, an alcoholic beverage which is obtained by fermentation of germinated barley malt aromatized with hops, two types of process are chiefly distinguished: "high fermentation," if it is operated between 15° and 25° Celcius and "low fermentation," if it is operated between 5° and 10° Celcius.

The first operation of the beer production cycle is the conversion of the barley into malt. The barley grains undergo soaking, then they are left to germinate for some time. The sprouting is arrested and the malt is dried. The latter, roasted and with the reticule removed, is ground so that, during the wort preparation process, the water can more easily extract the soluble substances. The preparation of the wort can be carried out by decoction and by infusion, in two or more stages. This operation is carried out at temperatures of 70° to 75° Celcius. The wort is separated from the spent malt by decantation or by filtration. The decanted wort is boiled with a certain amount of hops, the boiling produces the aromatization of the wort and the separation by coagulation of a number of protein substances which it contains. After cooling to 10°–14.5° Celcius, the wort passes into the fermentation vessels. Fermentation is an extremely delicate operation; the presence of micro-organisms foreign to those connected with the fermentation of the malt wort can be the cause of irrepatable damage to the product. It is necessary to render the wort sterile so that the action of the yeast is not superimposed by that of other micro-organisms. The choice of yeasts depend very much the characteristics of the beer and the normal fermenting agent of beer is the yeast "*Saccharomyces cerevisiae*."

Once the main fermentation is completed, the beer is permitted first to settle in a place where the temperature decreases slowly from 14.5° to 6° Celcius, then in a cold place at constant temperature of the order of minus 1° Celcius minimum. The first place is called the "warm keep", whilst the second place is called the "cold keep" during both keeps other fermentations take place which complete the organoleptic characteristics of the beer.

Before being recommended for consumption, the matured beer is filtered then placed in bottles, cans in casks or vats.

The present invention concerns relates especially to the phases of fermentation, warm keeping and cold keeping.

Up to the present time a number of vats are used for the fementation. The fermented beer is then transferred into a second series of vats for the warm keep then transferred again into a third series of vats for the cold keep. This process method has several disadvantages. It is necessary to provide a very complex transfer installation. Moreover, the number of vats is very large. After each batch of the beer, it is necessary to clean the transfer installation and the different vats, which necessitates the provision of a complex cleaning system.

The multiplicity of the vats, the transfer installation, and the cleaning system require very high investment costs, which create an increase of the cost price of the product. In fact, most of the pipes of the cleaning system and the transfer installation are in stainless steel. Furthermore, provision must be made for an adequate number of personnel for the carrying out of the different phases of the known process.

An object of the invention is to remedy these disadvantages and provide a new process in which the fermentation, the warm keep and the cold keep are carried out in a single installation, which obviates a large number of vats, simplifies the transfer installation and the cleaning system and thus reduces the cost price and enables a large quantity of beer of identical taste and appearance to be produced.

THE INVENTION

There is provided according to the invention a fermentation process for beer wherein into a single vat, a series of mash batches are tunned or pumped at increasing temperatures, for each batch so that an initially ascending convection current is created, in the vat in order to homogenize the beer with the yeast and to standardize the temperature then either complete fermentation, or a limited fermentation proceeds. After the aforesaid fermentation is completed, and the major sediments are removed, the warm keep phase is carried out at a slowly decreasing temperature. A major cooling of the beer is then achieved by circulation external to the vat, and then the beer enters the cold keep phase following which the beer is hominezed, centrifuged and filtered and filled Automatic cleaning of the empty vat is carried out before restarting a new cycle.

DETAILED DESCRIPTION

The invention will be further described in the following description given as a non-limiting example with reference to the accompanying drawing which is an operating diagram of the process according to the invention.

The wort is introduced via a pipe 1 into a vat 2. The tunning of fillings of this vat 2 is carried out by a series of mash batches and the yeasting is achieved by the first four batches of fermentation materials. It is necessary to introduce the wort at a certain temperature and it is recommended to introduce the first three mash batches at a temperature of 10° to 11° Celcius, the next four at a temperature of 12° Celcius and finally the last three at a temperature of 14° to 14.5° Celcius. It is necessary that the temperature at the end of tunning reaches 14.5° Celcius.

To obtain homogenization of the two products present, namely, the beer mash and the yeast and a uniform temperature in the vat 2, it is necessary to start a current in the interior of vat 2. This current is obtained by subjecting the different layers at water exchanger jackets 3, 4 and 5 to different temperatures by increasing from the top to the bottom. Thus the bottom layer at jackets 3, the warmest will have a tendency to rise, whilst the cold upper layers 4, 5 tend to be directed towards the bottom 6 of vat 2.

Fermentation then proceeds. For this it is necessaary that the temperature remains strictly constant and is of the order of 15° Celcius, whilst the pressure must be maintained between 0 and 500g per $cm^2$.

Two types of fermentation can be employed, the first consisting of a total fermentation, whereas the second consists of limited fermentation in relation to a total fermentation. In the second solution it is envisaged to carry out a fermentation of the order of 93% of the total fermentation.

During fermentation, the yeast settles with other solids and is deposited in cone 7. These sediments are ejected, passing through the pipe 8 and the yeast is recovered by means of a centrifuge 9. The beer is reinjected into vat 2 via the pipe 10.

After the fermentation phase, the warm keep phase proceeds. During this warm keep, the period of which is of the order of 5 days, a slow decrease of the temperature is instituted by jackets 3, 4 and 5 and the initial temperature of 14.5° Celcius is brought to 6 degrees Celcius while maintaining the convection currents for the homogenization. The pressure of 500g per cm² is retained. During this warm keep, the sediments are again ejected, that is to say the settled wastes consisting chiefly of nitrogenous matter and the yeast which is deposited in the cone 7 are ejected via pipe 8 and separated via centrifuge 9.

The drilling operation then proceeds for reducing the temperature of the beer. For this purpose, the beer located at the top part of vat 2 is drawn off via a pipe 11 is passed through a cooler 12 and is reintroduced via a pipe 13 at the base of cone 7 of the vat 2. The diastatic treatment is maintained continuously. The beer drawn off from the centrifuge 9, is taken via a pipe 14 to a vat 15 provided with an agitator 16. The beer is reintroduced from this vat 15 by means of pipe 17.

Provision is made in the vat 2 for a probe 18 provided with several markings 19, 20, 21 for the analyses of the content of carbon dioxide gas contained in the beer. As the case requires during the cooling stage, carbon dioxide gas is added after the chiller and the beer is thus regulated.

The cold keep then proceeds with the beer at a constant temperature of a minimum of minus 1° Celcius. Pressure is maintained at 500g per cm² and the duration of this cold keep is in the order of five days. During the course of the cold keep the sediments and the yeast are ejected in the aforesaid manner.

After the cold keep is completed, the beer is then centrifuged and filtered by means of the centrifuge 9 and filter 22 and is ready for the filling of bottles cans and casks.

In the case of fermentation limited to 93 percent of the total fermentation, the yeast is recovered by centrifugal means to obtain a percentage of constant and known dry matter. The yeast can be reinjected during recycling of the beer.

The process is then continued in accordance with the different stages described above.

Although the invention has been described in regard to a particular form of embodiment it should be understood that it is in no way limited thereto, and that one can make various modifications of form and materials without going outside the framework and the spirit of the invention.

What is claimed is:

1. A process for the fermentation of beer which comprises the steps of:
   a. tunning groups of mashed batches of wort serially into a single, cylindrical, vertically disposed vat having a conical bottom, said groups of batches initially differing in temperature;
   b. introducing the first group of batches into said vat through said bottom at temperatures in the range 10° – 11° Celcius, succeeding groups of batches at intermediate temperatures between said first group and a subsequent final group of batches, and the final group of batches at temperatures in the range 14° – 14.5° Celcius; whereby the temperature of said vat contents is equalized by convection currents resulting from the temperature differential between said batch groups layered with the highest temperature batch initially at the lowest position in said vat;
   c. introducing yeast into at least one of said batches and initiating fermentation by said introduced yeast;
   d. maintaining the contents of said vat, during fermentation, at a temperature of about 15° Celcius and at a positive pressure of about 500 grams/cm²;
   e. maintaining the temperature equalized vat contents at about 15° Celcius until a beer of the desired degree of fermentation is formed;
   f. instituting a warm keep phase for mellowing said beer, extending over a period of about 5 days during which the temperature of the fermentation products in said vat is slowly decreased from 14.5° Celcius to 6° Celcuis by cooling means in said vat;
   g. upon completion of the warm keep phase, the resultant mellowed beer is rapidly cooled to a temperature of about − 1° Celcius and maintained substantially thereat to institute a cold keep phase for finishing said beer and lasting for about 5 days;
   h. after which the finished beer is clarified, filtered and filled into suitable containers.

2. A process according to claim 1 wherein fermentation sediments which are deposited and concentrated in a conical bottom of said vat during the fermentation and keep phases are removed from said vat and recovered.

3. The process according to claim 1 wherein said fermentation is continued from 93 percent to total fermentation of the vat contents.

4. The process according to claim 1 wherein said rapid cooling is achieved by circulating the mellowed beer through heat exchange means external to said vat and returning the cooled beer to said vat for the cold keep phase.

5. The process according to claim 1 wherein during said cold keep the beer is subjected to a conventional continuous diastatic treatment and the regulation of its carbon dioxide content.

6. The process according to claim 1 wherein said fermentation and keep phases are conducted under a positive pressure of up to 500 gm per cm².

7. The process according to claim 2 wherein any beer which is removed from said vat with said sediments is separated therefrom by centrifuging and then returned to said vat.

* * * * *